(12) United States Patent
Fukaya et al.

(10) Patent No.: US 10,844,847 B2
(45) Date of Patent: Nov. 24, 2020

(54) THERMOACOUSTIC ENGINE

(71) Applicant: CENTRAL MOTOR WHEEL CO., LTD., Anjo (JP)

(72) Inventors: Noriyuki Fukaya, Miyoshi (JP); Takeshi Ito, Ebina (JP)

(73) Assignee: CENTRAL MOTOR WHEEL CO., LTD., Anjo (JP)

( * ) Notice: Subject to any disclaimer, the term of this patent is extended or adjusted under 35 U.S.C. 154(b) by 67 days.

(21) Appl. No.: 16/307,129

(22) PCT Filed: May 14, 2017

(86) PCT No.: PCT/JP2017/018126
§ 371 (c)(1),
(2) Date: Dec. 4, 2018

(87) PCT Pub. No.: WO2017/212871
PCT Pub. Date: Dec. 14, 2017

(65) Prior Publication Data
US 2019/0085833 A1 Mar. 21, 2019

(30) Foreign Application Priority Data
Jun. 9, 2016 (JP) .................................. 2016-114913

(51) Int. Cl.
*F03G 7/00* (2006.01)
*F25B 9/00* (2006.01)
*F02G 1/055* (2006.01)
*F03G 7/06* (2006.01)

(52) U.S. Cl.
CPC ............. *F03G 7/002* (2013.01); *F02G 1/055* (2013.01); *F03G 7/00* (2013.01); *F03G 7/06* (2013.01); *F25B 9/00* (2013.01); *F02G 2243/54* (2013.01); *F25B 2309/1403* (2013.01)

(58) Field of Classification Search
CPC . F03G 7/002; F03G 7/06; F02G 1/055; F02G 2243/54; F25B 2309/1403
See application file for complete search history.

(56) References Cited

U.S. PATENT DOCUMENTS

| 4,114,380 A | * | 9/1978 | Ceperley | ............... F02G 1/0435 60/721 |
| 5,647,216 A | * | 7/1997 | Garrett | .................... F25B 9/145 62/6 |
| 5,901,556 A | * | 5/1999 | Hofler | ..................... F03G 7/002 62/467 |

(Continued)

FOREIGN PATENT DOCUMENTS

| DE | 10 2015 104727 A1 | 10/2015 |
| WO | 2013/084830 A1 | 6/2013 |

*Primary Examiner* — Shafiq Mian (57) ABSTRACT

Disclosed are a thermoacoustic engine with high conversion efficiency from heat energy to acoustic energy and a designing method for the thermoacoustic engine. A stack of the thermoacoustic engine has a plurality of flow passages extending through a thermoacoustic piping section. A hot heat exchanger is coupled to one end in a longitudinal direction of the stack. A cold heat exchanger is coupled to the other end in the longitudinal direction of the stack. And a length in the longitudinal direction of the hot heat exchanger is greater than a length in the longitudinal direction of the stack, and is greater than a length in the longitudinal direction of the cold heat exchanger.

4 Claims, 5 Drawing Sheets

(56) References Cited

U.S. PATENT DOCUMENTS

| | | | | |
|---|---|---|---|---|
| 7,404,296 B2* | 7/2008 | Watanabe | ................ | F25B 9/145 |
| | | | | 62/6 |
| 8,375,729 B2* | 2/2013 | Schwartz | ................ | F25B 9/145 |
| | | | | 62/6 |
| 8,567,187 B2* | 10/2013 | Nakamura | ................ | F02G 1/04 |
| | | | | 60/517 |
| 8,584,471 B2* | 11/2013 | Schwartz | ................ | F25B 9/145 |
| | | | | 62/6 |
| 9,163,581 B2* | 10/2015 | Dyson, Jr. | ................ | F03G 7/00 |
| 9,739,187 B2* | 8/2017 | Miyairi | ................ | F02B 47/02 |
| | | | | 60/530 |
| 2005/0000233 A1* | 1/2005 | Hao | ................ | F25B 9/145 |
| | | | | 62/6 |
| 2009/0249797 A1* | 10/2009 | Backhaus | ................ | F25B 9/145 |
| | | | | 62/6 |
| 2014/0338369 A1 | 11/2014 | Hasegawa et al. | | |
| 2015/0281849 A1 | 10/2015 | Miwa et al. | | |
| 2016/0084239 A1* | 3/2016 | Miyairi | ................ | F03G 7/002 |
| | | | | 60/530 |

* cited by examiner

THERMOACOUSTIC ENGINE

TECHNICAL FIELD

The present invention relates to a thermoacoustic engine that allows a working gas to thermoacoustically oscillate.

BACKGROUND ART

Conventionally, promotion of effective energy utilization has been demanded in various industrial fields. For example, in light of a fact that a large amount of heat is still exhausted and abandoned from facilities such as plants, vehicles, and others, it has been desired to provide a technique to collect heat energy with high efficiency. The present inventor enthusiastically studied on this technique, and as a result, the inventor focused on utilization of a thermoacoustic engine that allows a working gas to thermoacoustically oscillate. The following Patent Literature 1 discloses one example of a system that generates electric energy using the thermoacoustic engines (hereinafter, also referred to as a "thermoacoustic electric generator system").

The thermoacoustic engines used in this thermoacoustic electric generator system is incorporated in a thermoacoustic piping section in which the working gas is enclosed and sealed. Each thermoacoustic engine includes a stack, a hot heat exchanger, and a cold heat exchanger. The stack has a plurality of flow passages extending through the thermoacoustic piping section in the longitudinal direction. The hot heat exchanger is coupled to one end in the longitudinal direction of the stack. The hot heat exchanger has an internal space for hot heat exchanging communicating with the plurality of flow passages and extending through the hot heat exchanger in the longitudinal direction, and is adapted to heat the working gas in the internal space for hot heat exchanging using the above-described exhaust heat or the like. The cold heat exchanger is coupled to the other end in the longitudinal direction of the stack. The cold heat exchanger has an internal space for cold heat exchanging communicating with the plurality of flow passages and extending through the cold heat exchanger in the longitudinal direction, and is adapted to cool the working gas in the internal space for cold heat exchanging.

According to this thermoacoustic engine, due to the temperature gradient generated between the both ends in the longitudinal direction of the stack, the working gas thermoacoustically oscillates along the longitudinal direction, thereby generating oscillatory waves (sonic waves) resulting from the longitudinal waves. As a result, acoustic energy (oscillatory energy) is generated inside the thermoacoustic pipe section. In this thermoacoustic electric generator system, a branch piping section branching from the thermoacoustic pipe section that is an annular piping section is provided with an electric energy generator. This electric energy generator is actuated by acoustic energy generated by the thermoacoustic engine so as to generate electric energy, and as a result, it is possible to collect the above-described heat energy of exhaust heat or the like with high efficiency.

CITATION LIST

Patent Literature

Patent Literature 1: WO2013/084830

SUMMARY OF THE INVENTION

Meanwhile, in order to collect heat energy of exhaust heat or the like using the above thermoacoustic engine with further higher efficiency, it is very important to promote further enhancement of conversion efficiency from heat energy to acoustic energy.

When making the thermoacoustic engine, in order to enhance conversion efficiency from heat energy to acoustic energy, the present inventor focused on respective lengths in the longitudinal direction of the stack, the hot heat exchanger, and the cold heat exchanger that configure the thermoacoustic engine. As a result of enthusiastic studies, the present inventor has found a relationship among respective lengths in the longitudinal direction of the stack, the hot heat exchanger, and the cold heat exchanger, the relationship being necessary for promoting enhancement of the conversion efficiency from heat energy to acoustic energy, and a method for determining these lengths.

The present invention has been made in light of the above points, and an object thereof is to provide a thermoacoustic engine with high conversion efficiency from heat energy to acoustic energy.

The thermoacoustic engine according to the present invention includes a stack, a hot heat exchanger, and a cold heat exchanger that are similar to those in the above description. The thermoacoustic engine according to the present invention is characterized in that the length in the longitudinal direction of the hot heat exchanger (hot heat exchanger length) is greater than the length in the longitudinal direction of the stack (stack length), and is greater than the length in the longitudinal direction of the cold heat exchanger (cold heat exchanger length). Hereinafter, for convenience of explanation, an amplitude in the longitudinal direction of longitudinal waves resulting from the above-described thermoacoustic oscillations of the working gas is referred to as a "displacement amplitude".

When thermoacoustic engines are made, normally, the stack length is determined such that the displacement amplitude of the working gas in the stack approximates (coincides with) the stack length. In addition, the sum of areas of the internal space for hot heat exchanging in which the working gas is present in the section of the hot heat exchanger (total area of the hot heat exchanger) is smaller than the sum of areas of the plurality of flow passages in the section of the stack (total area of the stack), and is substantially equal to the sum of areas of the internal space for cold heat exchanging in which the working gas is present in the section of the cold heat exchanger (total area of the cold heat exchanger).

When the working gas in the stack moves into the hot heat exchanger, because the total area of the hot heat exchanger is smaller than the total area of the stack, the displacement amplitude of the working gas in the hot heat exchanger becomes greater than the displacement amplitude of the working gas in the stack (if the volume of the working gas is supposed to be constant). In addition, the working gas expands upon receiving the heat because the temperature of the hot heat exchanger is higher than the average temperature of the stack. Due to this expansion, the displacement amplitude of the working gas in the hot heat exchanger becomes greater than the displacement amplitude of the working gas in the stack. Based on the above, it can be said that the displacement amplitude of the working gas in the hot heat exchanger is greater than the displacement amplitude of the working gas in the stack.

Based on the concept similar to the above description, it can be said that because the total area of the hot heat exchanger is substantially equal to the total area of the cold heat exchanger and the temperature of the hot heat exchanger is higher than the temperature of the cold heat exchanger, the displacement amplitude of the working gas in the hot heat exchanger becomes greater than the displacement amplitude of the working gas in the cold heat exchanger.

In order to enhance the conversion efficiency from heat energy to acoustic energy, it is necessary to increase the temperature gradient generated between the both ends of the stack. For this purpose, it is necessary to increase the heat exchange efficiency of the hot heat exchanger and the cold heat exchanger with the working gas. Therefore, it can be considered that it is important to determine the hot heat exchanger length and the cold heat exchanger length such that the displacement amplitude of the working gas in the hot heat exchanger approximates (coincides with) the hot heat exchanger length and the displacement amplitude of the working gas in the cold heat exchanger approximates (coincides with) the cold heat exchanger length.

Based on the above, it can be considered that if the stack length, the hot heat exchanger length, the cold heat exchanger length are determined such that the hot heat exchanger length is greater than the stack length and is greater than the cold heat exchanger length, the heat exchange efficiency of the hot heat exchanger and the cold heat exchanger with the working gas becomes enhanced; and as a result, the conversion efficiency from heat energy to acoustic energy is enhanced. The aforementioned features of the thermoacoustic engine according to the present invention are based on the above findings.

Based on the above findings, the manufacturing method for the thermoacoustic engine according to the present invention relates to a designing method for determining the hot heat exchanger length and the cold heat exchanger length relative to the predefined stack length. Details of the designing method for the thermoacoustic engine according to the present invention will be described later.

MODES FOR CARRYING OUT THE INVENTION

Hereinafter, an embodiment of a thermoacoustic engine according to the present invention will be described with reference to the drawings.

(Configuration)

Figure 1:
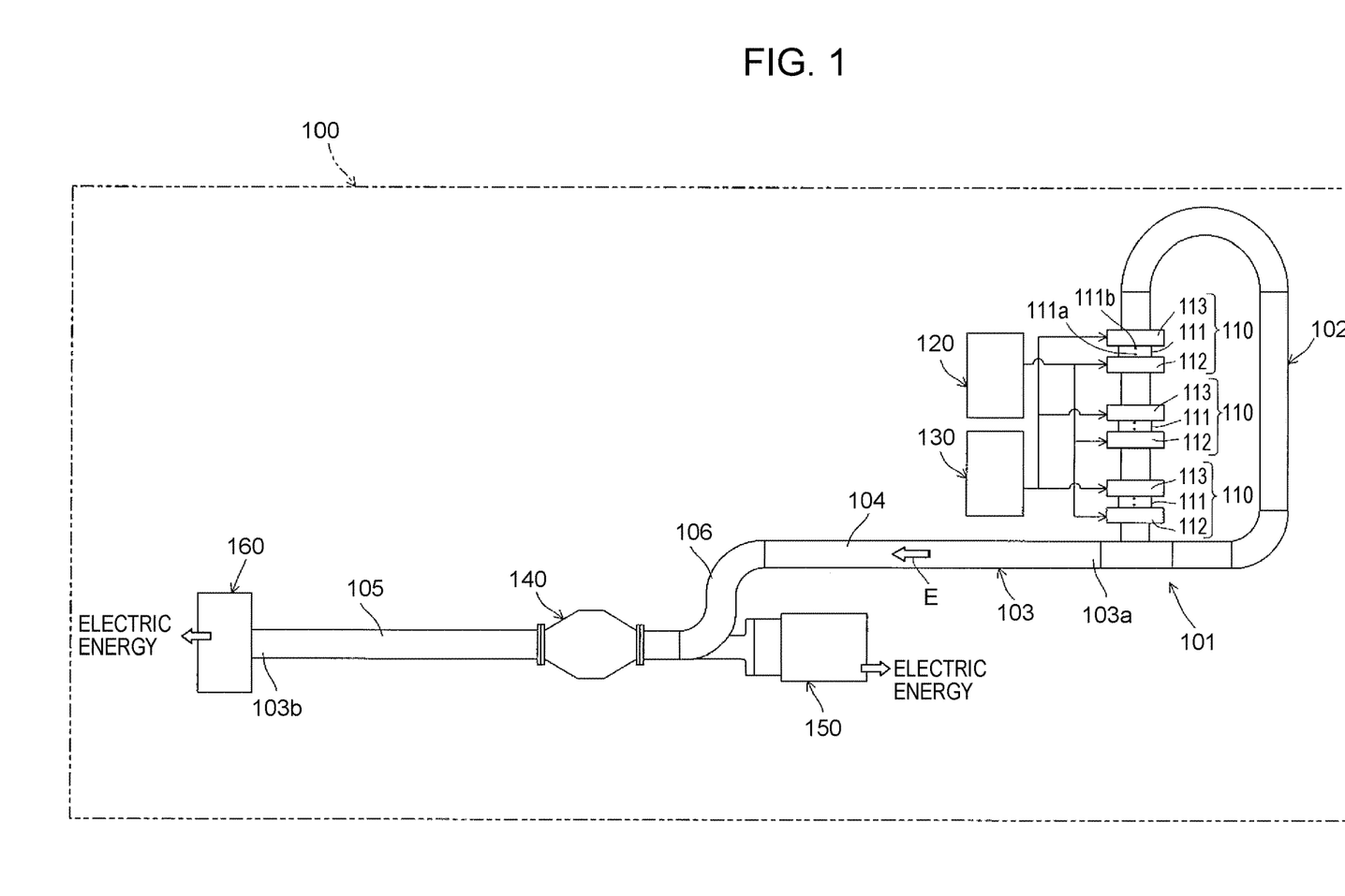
FIG. 1 is a view schematically showing a general configuration of a thermoacoustic electric generator system including thermoacoustic engines according to the present invention.

As shown in FIG. 1, a thermoacoustic electric generator system 100 includes a piping configuration unit 101 configured by metallic pipes. The piping configuration unit 101 includes an annular piping section 102 that is a piping section in an annular (loop) shape, and a branch piping section 103 that branches from the annular piping section 102 and has an in-pipe space communicating with an in-pipe space of the annular piping section 102. This annular piping section 102 corresponds to a "thermoacoustic piping section" of the present invention.

The branch piping section 103 is a piping section extending long from one end 103a to the other end 103b, where a branch point at which the branch piping section 103 branches from the annular piping section 102 is defined as the one end 103a. The branch piping section 103 is sealed by an energy extracting unit 160 at the other end 103b. A predetermined working gas (helium in the present embodiment) is enclosed and sealed in the annular piping section 102 and the branch piping section 103 at a predetermined pressure. Note that as the working gas, instead of using helium, nitrogen, argon, a mixed gas of helium and argon, air, or the like can be adopted.

The annular piping section 102 is provided with three thermoacoustic engines (also referred to as "motors") 110 that are connected in series. These three thermoacoustic engines 110 constitute a so-called "multistage type thermoacoustic engine". Each thermoacoustic engine 110 includes: a stack 111 incorporated in a pipe of the annular piping section 102; a hot heat exchanger 112 arranged to face one end 111a that is a high temperature part of the stack 111; and a cold heat exchanger 113 arranged to face the other end 111b that is a normal temperature part (or a low temperature part) of the stack 111. Note that the number of the thermoacoustic engines 110 to be installed is not limited to three, and any other installation number may be selected as necessary.

Figure 2:
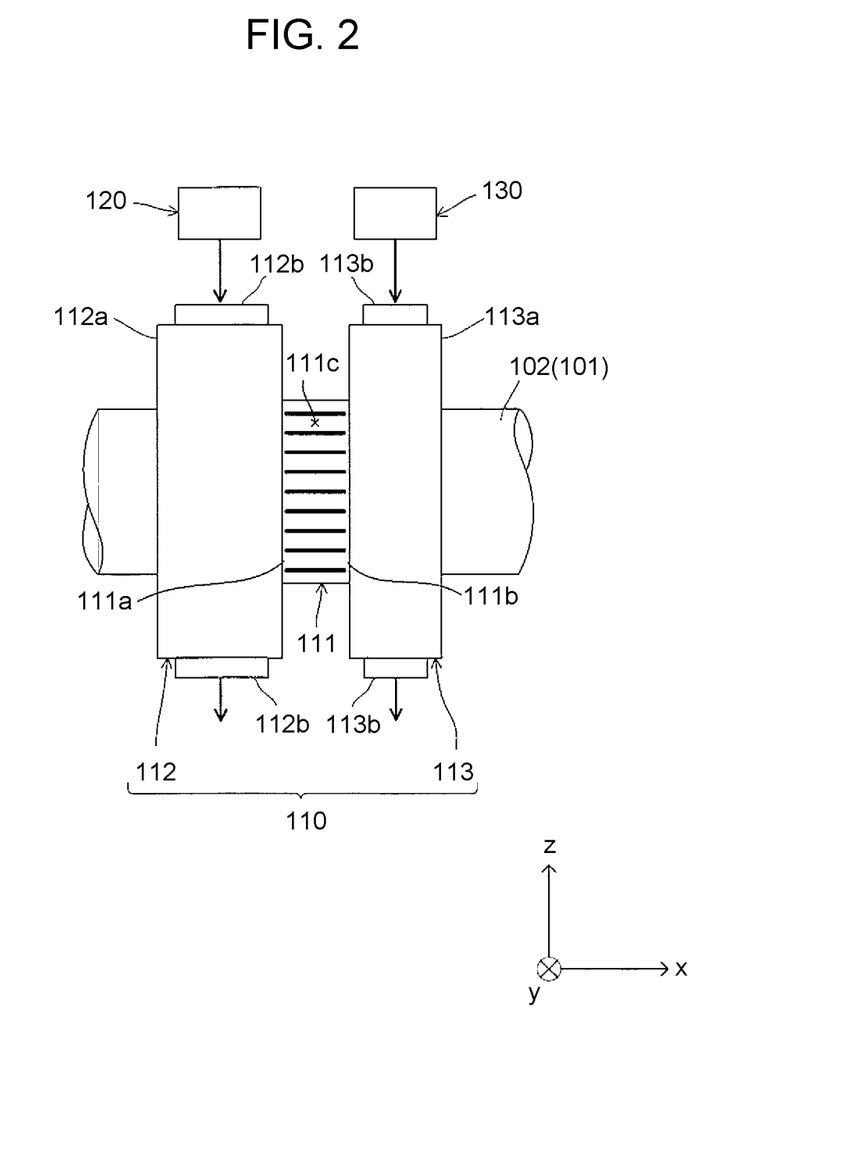
FIG. 2 is a view schematically showing a configuration of the thermoacoustic engine shown in FIG. 1.
Figure 3:
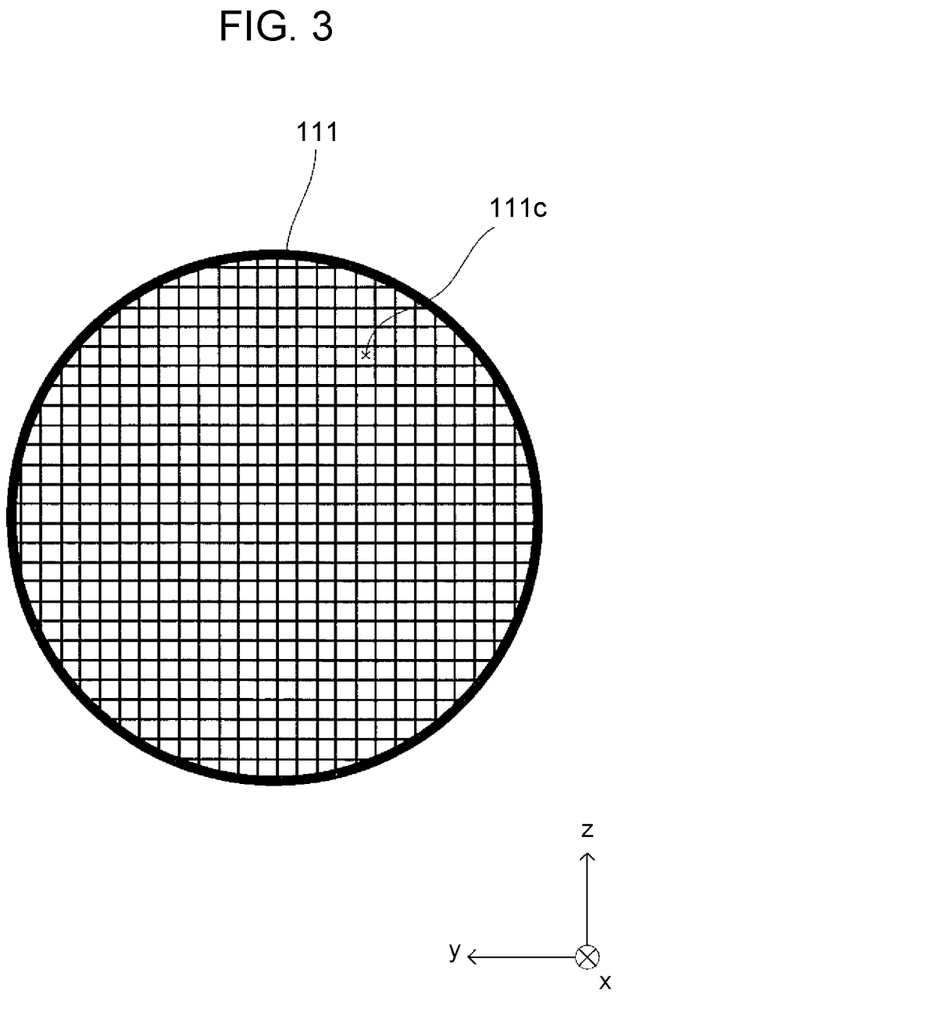
FIG. 3 is a view showing one example of an end surface (a plurality of flow passages) of a stack showing in FIG. 2.

As shown in FIG. 2 and FIG. 3, each stack 111 is a structural body in a columnar shape having a circular sectional shape perpendicular to the longitudinal direction of the piping of the annular piping section 102 (extending direction of the piping, an x-axis direction). Both end surfaces in the longitudinal direction of the piping of each stack 111 are flat surfaces perpendicular to the longitudinal direction of the piping (x-axis direction). Each stack 111 has a plurality of flow passages 111c extending therethrough in parallel to one another along the longitudinal direction of the piping (x-axis direction) between the one end 111a and the other end 111b of the stack 111. The working gas is configured to oscillate in the plurality of flow passages 111c.

In the example shown in FIG. 3, the plurality of flow passages 111c is formed to be separated in a matrix form by a number of walls that laterally and longitudinally section the inside of the stack 111. As far as the stack 111 is formed thereinside with the plurality of flow passages extending therethrough in the longitudinal direction of the piping, the inside of the stack 111 may be sectioned in any form, such as a honeycomb form.

As the stack 111, for example, there may be typically used a structural body made of ceramics, a structural body formed by stacking a plurality of thin mesh plates of stainless steel in parallel at fine pitches, unwoven fabrics made of metallic fibers, or the like. As the stack 111, instead of using one having a circular sectional shape, there may be adopted one having an oval sectional shape, a polygonal sectional shape, or the like.

In the stack 111, when a predetermined temperature gradient occurs between the one end 111a and the other end 111b, the working gas in the annular piping section 102 becomes unstable, so that the working gas thermoacoustically oscillates along the longitudinal direction of the piping. As a result, oscillatory waves (also referred to as "sonic waves", "oscillating flow", or "work flow") resulting from longitudinal waves oscillating along the longitudinal direction of the piping are formed, and the oscillatory waves are transmitted from the inside of the pipe of the annular piping section 102 to the inside of the pipe of the branch piping section 103.

Figure 4:
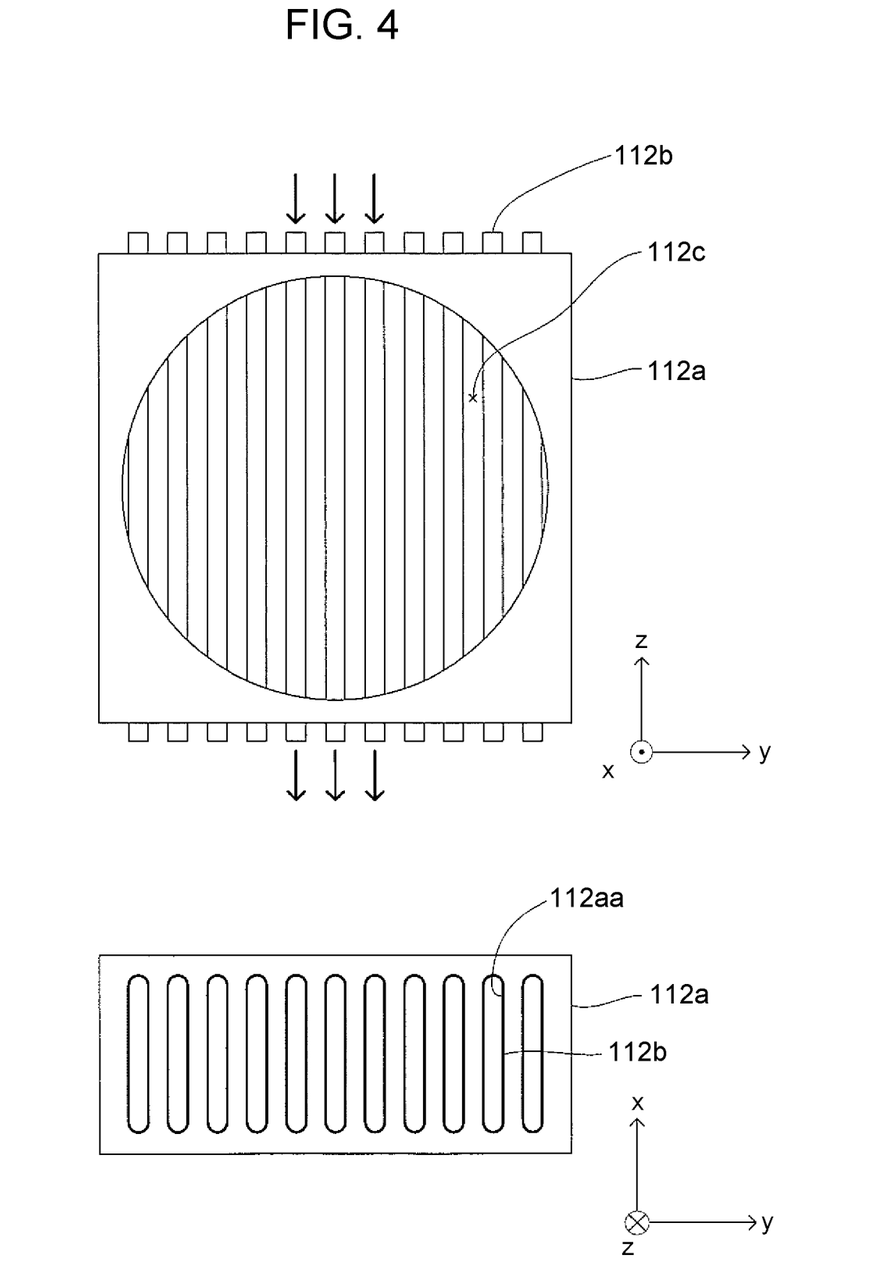
FIG. 4 is a view schematically showing a configuration of a hot heat exchanger shown in FIG. 2.

As shown in FIG. 2, each hot heat exchanger 112 is connected to a heating source 120. The heating source 120 functions to supply a heating fluid, such as warm air and warm water, to each hot heat exchanger 112. As shown in FIG. 2 and FIG. 4, each hot heat exchanger 112 includes a block 112a assembled to the one end 111a of the stack 111, and a plurality of tubes 112b assembled into the block 112a. The block 112a is formed with a columnar internal space for hot heat exchanging 112c extending through the block 112a in the longitudinal direction of the piping (x-axis direction). The internal space for hot heat exchanging 112c communicates with the plurality of flow passages 111c of the stack 111, and the working gas is configured to oscillate inside the internal space for hot heat exchanging 112c.

The side surface of the block 112a is formed with a plurality of long through-holes 112aa each having the same shape and extending in the longitudinal direction of the piping (x-axis direction) such that the through-holes 112aa are arranged along a first direction (z-axis direction) perpendicular to the longitudinal direction of the piping with predetermined intervals in a second direction (y-axis direction) perpendicular to the longitudinal direction of the piping and the first direction. The sectional shape of each tube 112b has the same shape, which is a long-hole flat shape corresponding to each through-hole 112aa. The reason why the sectional shape of each tube 112b has the long-hole flat shape is to secure a sufficient flow passage area for the heating fluid flowing through the inside of the tube.

The plurality of tubes 112b are inserted and fixed to the corresponding through-holes 112aa, thereby being assembled into the block 112a so as to extend across the internal space for hot heat exchanging 112c in the first direction (z-axis direction) while the tubes 112b are arranged apart from each other. As a result, the plurality of tubes 112b are aligned such that the extending direction of each tube 112b in a flat shape coincides with the longitudinal direction of the piping (x-axis direction). A contact portion between each through-hole 112aa and each tube 112b is subjected to predetermined seal treatment so as to prevent the working gas enclosed and sealed inside from leaking out to the outside.

The plurality of tubes 112b is connected to the heating source 120. By bringing the heating fluid supplied from the heating source 120 to flow through the plurality of tubes 112b, heat exchange is carried out between the heating fluid in the plurality of tubes 112b and the working gas in the internal space for hot heat exchanging 112c of the block 112a. As a result, the working gas present around the one end 111a of the stack 111 is heated. The heating fluid decreased in temperature after the heat exchange is returned to the heating source 120 to be re-heated.

Each cold heat exchanger 113 has the same configuration as the above described configuration of each hot heat exchanger 112. That is, as shown in FIG. 2, each cold heat exchanger 113 is connected to a cooling source 130. The cooling source 130 functions to supply a cooling fluid, such as cold air and cold water, to each cold heat exchanger 113. Each cold heat exchanger 113 includes a block 113a assembled to the other end 111b of the stack 111, and plurality of tubes 113b assembled into the block 113a. The block 113a is formed with a columnar internal space for cold heat exchanging 113c (see FIG. 5 described later) extending therethrough along the longitudinal direction of the piping (x-axis direction). The internal space for cold heat exchanging 113c communicates with the plurality of flow passages 111c of the stack 111, and the working gas is configured to oscillate in the internal space for cold heat exchanging 113c.

The plurality of tubes 113b each having a flat-shaped section is assembled into the block 113a so as to extend across the internal space for cold heat exchanging 113c in the first direction (z-axis direction) while the plurality of tubes 113b are arranged apart from each other The plurality of tubes 113b is connected to the cooling source 130. By bringing the cooling fluid supplied from the cooling source 130 to flow through the plurality of tubes 113b, heat exchange is carried out between the cooling fluid in the plurality of tubes 113b and the working gas in the internal space for cold heat exchanging 113c of the block 113a. As a result, the working gas present around the other end 111b of the stack 111 is cooled. The cooling fluid increased in temperature after the heat exchange is returned to the cooling source 130 to be re-cooled.

In cooperation between heating action by the hot heat exchanger 112 and cooling action by the cold heat exchanger 113, the predetermined temperature gradient occurs between the one end 111a and the other end 111b in each stack 111. That is, the hot heat exchanger 112 and the cold heat exchanger 113 configure a heat exchanger that carries out heat exchange with the working gas to generate the temperature gradient between the both ends of the plurality of flow passages 111c of each stack 111 so as to bring the working gas enclosed and sealed in the piping configuration unit 101 to thermoacoustically oscillate.

Returning to FIG. 1, the branch piping section 103 includes a first piping part 104 linearly extending between the annular piping section 102 and a turbine 140, a second piping part 105 linearly extending on the opposite side of the turbine 140 from the annular piping section 102, and a crank piping part 106 that is bent in a crank shape so as to couple the first piping part 104 to the second piping part 105.

The turbine 140 is configured to communicate with the inside of the pipe of the branch piping section 103, and functions to convert acoustic energy (also referred to as "oscillatory energy") due to the oscillatory waves of the working gas present inside the pipe of the branch piping section 103 into mechanical rotational energy. That is, this turbine 140 is provided to the branch piping section 103, and rotates upon receiving acoustic energy generated by the thermoacoustic oscillations of the working gas in the thermoacoustic engines 110. An electric energy generator 150 that converts kinetic energy (rotational energy) generated by rotation of the turbine 140 to electric energy is connected to the turbine 140.

The energy extracting unit 160 to extract the acoustic energy of the working gas from the branch piping section 103 to the outside of the pipe is provided to the other end 103b of the branch piping section 103, that is, the pipe end, located on the opposite side to the turbine 140, of the both pipe ends of the second piping part 105. This energy extracting unit 160 is configured typically by a well-known linear electric energy generator capable of outputting electric energy (electric power) upon receiving pressure oscillations, a speaker-type electric energy generator, or the like.

(Operation)

Hereinafter, operation of the above-configured thermoacoustic electric generator system 100 will be briefly described based on the above description. As shown in FIG. 1, in each thermoacoustic engine 110, when the one end 111a of the stack 111 is heated by the hot heat exchanger 112 and the other end 111b of the stack 111 is cooled by the cold heat exchanger 113, a temperature gradient is generated between the one end 111a and the other end 111b of the stack 111. Due to this temperature gradient, oscillatory waves mainly resulting from the thermoacoustic oscillations of the working gas are generated in the stack 111. Acoustic energy (oscillatory energy) resulting from the oscillatory waves (sonic waves) are transmitted from the annular piping section 102 through the branch piping section 103 of the piping configuration unit 101 to the turbine 140, and are further transmitted to the energy extracting unit 160. In this case, the branch piping section 103 is configured as a resonance pipe (waveguide pipe) for guiding the acoustic energy of the working gas generated in the thermoacoustic engine 110. Part of the acoustic energy is extracted by the turbine 140 that is energy extracting means, and is converted into electric energy (electric power) by the electric energy generator 150 connected to the turbine 140, and is extracted again by the energy extracting unit 160 to be converted into predetermined energy (e.g. oscillatory energy, electric energy, etc.).

(Designing of Stack Length, Hot Heat Exchanger Length, and Cold Heat Exchanger Length, and Operation Effects)

In order to collect heat energy of exhaust heat or the like with further higher efficiency using the thermoacoustic engines 110, it is important to promote further enhancement of the conversion efficiency from heat energy to acoustic energy. When making the thermoacoustic engine, in order to enhance the conversion efficiency from heat energy to acoustic energy, the present inventor focused on respective lengths in the longitudinal direction of the piping of the stack 111, the hot heat exchanger 112, and the cold heat exchanger 113 (the stack length, the hot heat exchanger length, and the cold heat exchanger length) constituting the thermoacoustic engine 110.

As a result of enthusiastic studies, the present inventor has found a method for determining the hot heat exchanger length and the cold heat exchanger length relative to the predefined stack length, the length being necessary for enhancement of the conversion efficiency from heat energy to acoustic energy.

Figure 5:
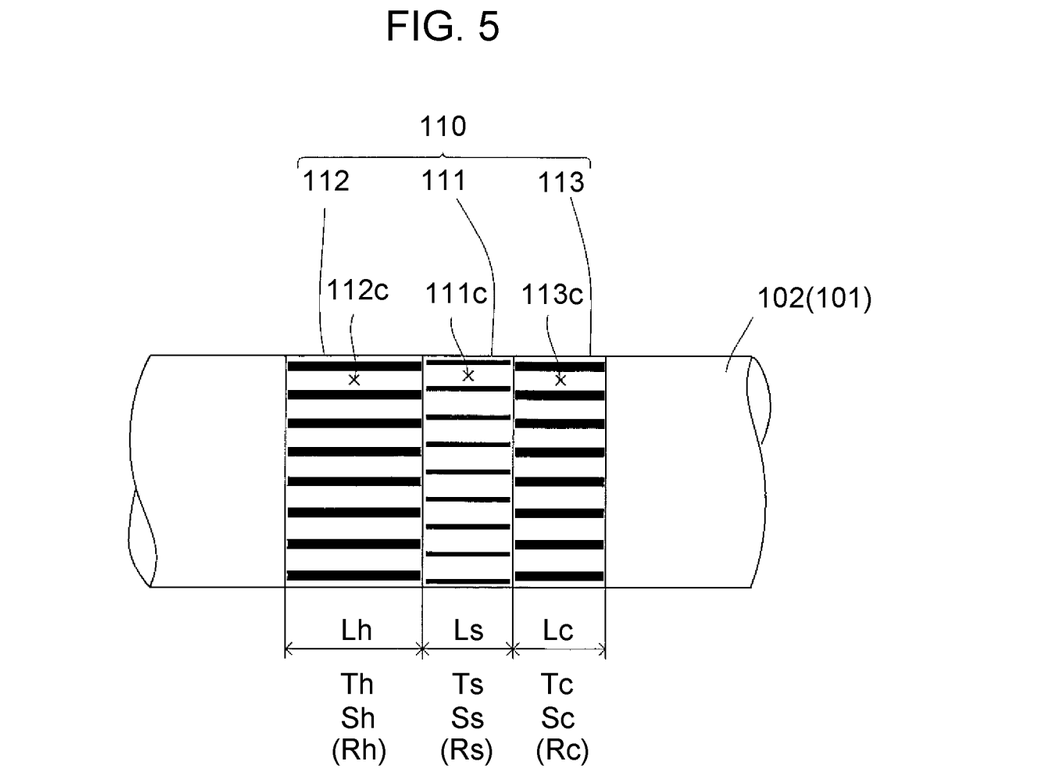
FIG. 5 is a view explaining respective elements of the thermoacoustic engine shown in FIG. 2.

Hereinafter, for convenience of explanation, as shown in FIG. 5, the stack length is defined as Ls, the hot heat exchanger length is defined as Lh, and the cold heat exchanger length is defined as Lc. In addition, of the thermoacoustic engine 110, an average temperature of the stack 111 (stack temperature) during operation (during the normal running) is defined as Ts, a temperature of the hot heat exchanger 112 (hot heat exchanger temperature) during the operation (during the normal running) is defined as Th, and a temperature of the cold heat exchanger 113 (cold heat exchanger temperature) during the operation (during the normal running) is defined as Tc. Note that each above-described "temperature" denotes an absolute temperature.

Furthermore, the sum of areas of the plurality of flow passages 111c in a section of the stack 111 (total area of the stack) is defined as Ss, the sum of areas of the internal space for hot heat exchanging 112c in which the working gas is present in a section of the hot heat exchanger 112 (total area of the hot heat exchanger) is defined as Sh, and the sum of areas of the internal space for cold heat exchanging 113c in which the working gas is present in a section of the cold heat exchanger 113 (total area of the cold heat exchanger) is defined as Sc. Note that the "section" denotes a section orthogonal to the longitudinal direction of the piping. In addition, an amplitude in the longitudinal direction of the piping of longitudinal waves resulting from the above-described thermoacoustic oscillations of the working gas is referred to as a "displacement amplitude".

When the thermoacoustic engine 110 is made, normally, the stack length Ls is defined such that the displacement amplitude of the working gas in the stack 111 approximates (coincides with) the stack length Ls. In addition, the total area of the hot heat exchanger Sh is often determined to be smaller than the total area of the stack Ss and is approximately equal to the total area of the cold heat exchanger Sc. The displacement amplitude of the working gas in the stack 111 can be adjusted to any value by adjusting a temperature rate between the hot heat exchanger temperature Th and the cold heat exchanger temperature Tc (Th/Tc), and parameters, such as the total area of the stack Ss.

In order to enhance the conversion efficiency from heat energy to acoustic energy, it is necessary to increase the temperature gradient generated between the both ends of the stack 111. For this purpose, it is necessary to enhance the heat exchange efficiency of the hot heat exchanger 112 and the cold heat exchanger 113 with the working gas. Therefore, it can be considered that it is important to determine the hot heat exchanger length Lh and the cold heat exchanger length Lc such that the displacement amplitude of the working gas in the hot heat exchanger 112 approximates (coincides with) the hot heat exchanger length Lh and the displacement amplitude of the working gas in the cold heat exchanger 113 approximates (coincides with) the cold heat exchanger length Lc.

When the working gas in the stack 111 moves into the hot heat exchanger 112, because the total area of the hot heat exchanger Sh is smaller than the total area of the stack Ss, the displacement amplitude of the working gas in the hot heat exchanger 112 becomes greater than the displacement amplitude of the working gas in the stack 111 (if the volume of the working gas is supposed to be constant). With respect to this point, a rate of change (rate of increase) in the "displacement amplitude of the working gas in the hot heat exchanger 112" relative to the "displacement amplitude of the working gas in the stack 111" is equal to a rate of the "total area of the stack Ss" relative to the "total area of the hot heat exchanger Sh" (Ss/Sh).

In addition, when the working gas in the stack 111 moves into the hot heat exchanger 112, the working gas expands upon receiving heat because the hot heat exchanger temperature Th is higher than the stack temperature Ts. Also due to this expansion, the displacement amplitude of the working gas in the hot heat exchanger 112 becomes greater than the displacement amplitude of the working gas in the stack 111. With respect to this point, a rate of change (rate of increase) in the "displacement amplitude of the working gas in the hot heat exchanger 112" relative to the "displacement amplitude of the working gas in the stack 111" is equal to a rate of the "hot heat exchanger temperature Th" relative to the "stack temperature Ts" (Th/Ts).

Based on the above, under the condition that the stack length Ls is predefined such that the displacement amplitude of the working gas in the stack 111 approximates (coincides with) the stack length Ls, the hot heat exchanger length Lh necessary for allowing the hot heat exchanger length Lh to approximate (coincide with) the displacement amplitude of the working gas in the hot heat exchanger 112 can be expressed by the following formula (1).

$$Lh = Ls \times (Th/Ts) \times (Ss/Sh) \tag{1}$$

Similarly, when the working gas in the stack 111 moves into the cold heat exchanger 113, because the total area of the cold heat exchanger Sc is smaller than the total area of the stack Ss, the displacement amplitude of the working gas in the cold heat exchanger 113 becomes greater than the displacement amplitude of the working gas in the stack 111 (if the volume of the working gas is supposed to be constant). With respect to this point, a rate of change (rate of increase) in the "displacement amplitude of the working gas in the cold heat exchanger 113" relative to the "displacement amplitude of the working gas in the stack 111" is equal to a rate of the "total area of the stack Ss" relative to the "total area of the cold heat exchanger Sc" (Ss/Sc).

In addition, when the working gas in the stack 111 moves into the cold heat exchanger 113, the working gas gives off heat and contracts because the cold heat exchanger temperature Tc is lower than the stack temperature Ts. Due to this contraction, the displacement amplitude of the working gas in the cold heat exchanger 113 becomes smaller than the displacement amplitude of the working gas in the stack 111. With respect to this point, a rate of change (rate of increase) in the "displacement amplitude of the working gas in the cold heat exchanger 113" relative to the "displacement amplitude of the working gas in the stack 111" is equal to a rate of the "cold heat exchanger temperature Tc" relative to the "stack temperature Ts" (Tc/Ts).

Based on the above, under the condition that the stack length Ls is predefined such that the displacement amplitude of the working gas in the stack 111 approximates (coincides with) the stack length Ls, the cold heat exchanger length Lc necessary for allowing the cold heat exchanger length Lc to approximate (coincide with) the displacement amplitude of the working gas in the cold heat exchanger 113 can be expressed by the following formula (2).

$$Lc=Ls\times(Tc/Ts)\times(Ss/Sc) \tag{2}$$

In this manner, under the condition that the stack length Ls is predefined, by setting the hot heat exchanger length Lh and the cold heat exchanger length Lc to be the respective values expressed by the above formula (1) and the above formula (2), the heat exchange efficiency of the hot heat exchanger 112 and the cold heat exchanger 113 with the working gas becomes enhanced; and as a result, it is possible to make the thermoacoustic engine 110 having high conversion efficiency from heat energy to acoustic energy.

As aforementioned, in the thermoacoustic engine 110, it is determined that the total area of the hot heat exchanger Sh is smaller than the total area of the stack Ss, and is substantially equal to the total area of the cold heat exchanger Sc. In addition, the hot heat exchanger temperature Th is higher than the stack temperature Ts, and is higher than the cold heat exchanger temperature Tc.

Accordingly, in the above formula (1), the value (Th/Ts) and the value (Ss/Sh) are both greater than "1". As a result, in the above formula (1), the hot heat exchanger length Lh is greater than the stack length Ls across the board.

On the other hand, in the above formula (2), the value (Tc/Ts) is smaller than "1", and the value (Ss/Sc) is greater than "1".
As a result, in the above formula (2), the magnitude correlation between the cold heat exchanger length Lc and the stack length Ls is not determined across the board. However, since the total area of the hot heat exchanger Sh is substantially equal to the total area of the cold heat exchanger Sc and the hot heat exchanger temperature Th is higher than the cold heat exchanger temperature Tc, comparing the above formula (1) and the above formula (2), the hot heat exchanger length Lh becomes greater than the cold heat exchanger length Lc across the board.

As aforementioned, if the stack length Ls, the hot heat exchanger length Lh, and the cold heat exchanger length Lc are determined such that the hot heat exchanger length Lh is greater than the stack length Ls and is also greater than the cold heat exchanger length Lc, compared with the case in which these conditions are not satisfied, the heat exchange efficiency of the hot heat exchanger 112 and the cold heat exchanger 113 with the working gas becomes higher; and as a result, it is possible to enhance the conversion efficiency from heat energy to acoustic energy in the thermoacoustic engine 110.

The invention is not only limited to the above typical embodiment, and various applications and modifications can be considered without departing from the purpose of the invention. For example, each of the following embodiments, to which the above embodiment is applied, can also be implemented.

In the above embodiment, the total area of the stack Ss, the total area of the hot heat exchanger Sh, and the total area of the cold heat exchanger Sc are adopted as the parameters in the above formula (1) and the above formula (2); however, in the case in which a sectional area of the columnar space (space having no walls to section the space into the plurality of flow passages 111c) defined by a cylindrical inner wall inside the stack 111, a sectional area of the columnar space (space having no tubes 112b) defined by the cylindrical inner wall inside the hot heat exchanger 112 (block 112a), and a sectional area of the columnar space (space having no tubes 113b) defined by the cylindrical inner wall inside the cold heat exchanger 113 (block 113a) are all equal to one another (hereinafter, referred to as a "pipe sectional area Sa"), as shown in the formula (3) and the formula (4) below, instead of the total area of the stack Ss, the total area of the hot heat exchanger Sh, and the total area of the cold heat exchanger Sc, an aperture rate of the stack Rs, an aperture rate of the hot heat exchanger Rh, and an aperture rate of the cold heat exchanger Rc can be adopted.

$$Lh=Ls\times(Th/Ts)\times(Rs/Rh) \tag{3}$$

$$Lc=Ls\times(Tc/Ts)\times(Rs/Rc) \tag{4}$$

Herein, the aperture rate of the stack Rs is defined as (the total area of the stack Ss)/(the pipe sectional area Sa), the aperture rate of the hot heat exchanger Rh is defined as (the total area of the hot heat exchanger Sh)/(the pipe sectional area Sa), and the aperture rate of the cold heat exchanger Rc is defined as (the total area of the cold heat exchanger Sc)/(the pipe sectional area Sa).

REFERENCE SIGNS LIST

100 . . . thermoacoustic electric generator system, 110 . . . thermoacoustic engine, 111 . . . stack, 111a . . . one end, 111b . . . the other end, 111c . . . plurality of flow passages, 112 . . . hot heat exchanger, 112a . . . block, 112c . . . internal space for hot heat exchanging, 113 . . . cold heat exchanger, 113a . . . block, 113c . . . internal space for cold heat exchanging, 120 . . . heating source, 130 . . . cooling source

What is claimed is:

1. A thermoacoustic engine incorporated in a thermoacoustic piping section in which a working gas is enclosed and sealed, the thermoacoustic engine comprising:
a stack having a plurality of flow passages extending through an annular portion of the thermoacoustic piping section in a longitudinal direction of the annular portion of the thermoacoustic piping section, the stack having first and second opposite ends in the longitudinal direction:
a hot heat exchanger coupled to the first end of the stack, the hot heat exchanger having a first internal space for hot heat exchanging and communicating with the plurality of flow passages and extending through the hot heat exchanger in the longitudinal direction, and configured to heat the working gas in the first internal space by the hot heat exchanging: and a cold heat exchanger coupled to the second end of the stack, the cold heat exchanger having a second internal space for cold heat exchanging and communicating with the plurality of flow passages and extending through the cold heat exchanger in the longitudinal direction, and configured to cool the working gas in the second internal space by the cold heat exchanging, wherein a length of the hot heat exchanger in the longitudinal direction is greater than a length of the stack in the longitudinal direction, and is greater than a length of the cold heat exchanger in the longitudinal direction.

2. The thermoacoustic engine according to claim 1, wherein a sum of areas of the first internal space in which the working gas is present in a section of the hot heat exchanger is smaller than a sum of areas of the plurality of flow passages in a section of the stack, and is equal to a sum of areas of the second internal space in which the working gas is present in a section of the cold heat exchanger.

3. The thermoacoustic engine according to claim 2, wherein:

an average temperature of the stack during operation of the thermoacoustic engine is defined as Ts, a temperature of the hot heat exchanger during the operation is defined as Th, a temperature of the cold heat exchanger during the operation is defined as Tc, the sum of the areas of the plurality of flow passages in the section of the stack is defined as Ss, the sum of the areas of the first internal space in which the working gas is present in the section of the hot heat exchanger is defined as Sh, the sum of the areas of the second internal space in which the working gas is present in the section of the cold heat exchanger is defined as Sc, and the length of the stack in the longitudinal direction is defined as Ls;

the length of the hot heat exchanger in the longitudinal direction is defined as Lh and satisfies: Ls×(Th/Ts)×(Ss/Sh); and the length of the cold heat exchanger in the longitudinal direction is defined as Lc and satisfies: Ls×(Tc/Ts)×(Ss/Sc).

4. The thermoacoustic engine according to claim 1, wherein:

an average temperature of the stack during operation of the thermoacoustic engine is defined as Ts, a temperature of the hot heat exchanger during the operation is defined as Th, a temperature of the cold heat exchanger during the operation is defined as Tc, a sum of areas of the plurality of flow passages in a section of the stack is defined as Ss, a sum of areas of the first internal space in which the working gas is present in a section of the hot heat exchanger is defined as Sh, a sum of areas of the second internal space in which the working gas is present in a section of the cold heat exchanger is defined as Sc, and the length of the stack in the longitudinal direction is defined as Ls;

the length of the hot heat exchanger in the longitudinal direction is defined as Lh and satisfies: Ls×(Th/Ts)×(Ss/Sh); and the length of the cold heat exchanger in the longitudinal direction is defined as Le and satisfies: Ls×(Tc/Ts)×(Ss/Sc).

* * * * *